US010730026B2

(12) United States Patent
Hoare et al.

(10) Patent No.: US 10,730,026 B2
(45) Date of Patent: Aug. 4, 2020

(54) PERSONAL BLENDER

(71) Applicant: BREVILLE PTY LIMITED, Alexandria, New South Wales (AU)

(72) Inventors: Richard Hoare, Lane Cove (AU); Raymond George Corkin, Denham Court (AU); Khon Thai, Campsie (AU)

(73) Assignee: BREVILLE PTY LIMITED, Alexandria, New South Wales (AU)

( * ) Notice: Subject to any disclaimer, the term of this patent is extended or adjusted under 35 U.S.C. 154(b) by 0 days.

(21) Appl. No.: 15/755,039

(22) PCT Filed: Aug. 25, 2016

(86) PCT No.: PCT/AU2016/000291
§ 371 (c)(1),
(2) Date: Feb. 23, 2018

(87) PCT Pub. No.: WO2017/031525
PCT Pub. Date: Mar. 2, 2017

(65) Prior Publication Data
US 2018/0236421 A1    Aug. 23, 2018

(30) Foreign Application Priority Data

Aug. 25, 2015  (AU) .................................. 2015903427

(51) Int. Cl.
*B01F 15/00*  (2006.01)
*A47J 43/046*  (2006.01)
(Continued)

(52) U.S. Cl.
CPC ....... *B01F 15/00798* (2013.01); *A47J 43/046* (2013.01); *A47J 43/0727* (2013.01);
(Continued)

(58) Field of Classification Search
CPC .............. B65D 41/04; B01F 15/00798; B01F 2215/0026; B01F 7/162; A47J 43/046; A47J 43/0727
See application file for complete search history.

(56) References Cited

U.S. PATENT DOCUMENTS 7,441,944 B2   10/2008  Sands
8,317,053 B2   11/2012  Cronin et al.
(Continued)

FOREIGN PATENT DOCUMENTS

DE    20 2009 011685 U1   12/2009
GB         2 299 985 A    10/1996
WO    WO-2004/058021 A1    7/2004

OTHER PUBLICATIONS

International Search Report and Written Opinion for PCT/AU2016/000291, dated Nov. 8, 2016.
(Continued)

*Primary Examiner* — Anshu Bhatia
(74) *Attorney, Agent, or Firm* — Marshall, Gerstein & Borun LLP

(57) ABSTRACT

A blender assembly including a blender vessel and a blender hub. The blender hub having a plurality of first guide elements. The blender vessel having a rim, the blender vessel further having a plurality of second guide elements that each cooperate with a respective one of the first guide elements for forming a coupled and a sealed engagement to the blender hub. By releasing the coupling, the first and second guide elements cooperate to provide a two-stage release. A first stage of the release breaking the sealed engagement, and maintaining a loose coupled engagement, between the blender hub and the bender vessel. A second stage of the release, subsequent to the first stage of the
(Continued)

release, releasing the coupled engagement between the blender hub and the blender vessel.

19 Claims, 13 Drawing Sheets

(51) Int. Cl.
    *B65D 41/04*     (2006.01)
    *A47J 43/07*     (2006.01)
    *B01F 7/16*     (2006.01)

(52) U.S. Cl.
    CPC .............. *B01F 7/162* (2013.01); *B65D 41/04* (2013.01); *B01F 2215/0026* (2013.01)

(56) References Cited

U.S. PATENT DOCUMENTS

| | | |
|---|---|---|
| 8,469,586 B2 | 6/2013 | Schleinzer |
| D734,988 S | 7/2015 | Smith |
| 2006/0153003 A1 | 7/2006 | Sands |
| 2008/0273941 A1 | 11/2008 | Van Cor |
| 2014/0247686 A1* | 9/2014 | Arnett .................. A47J 43/046 366/205 |

OTHER PUBLICATIONS

Extended European Search Report for European Patent Application No. 16 83 8110, dated Feb. 8, 2019.

* cited by examiner

PERSONAL BLENDER

FIELD OF THE INVENTION

The invention relates to food blending devices and in preferred embodiments, to blenders adapted to process smaller servings than conventional domestic blenders.

The invention has been developed primarily for use as a personal blender and will be described hereinafter with reference to this application. However, it will be appreciated that the invention is not limited to this particular field of use.

BACKGROUND OF THE INVENTION

Any discussion of the prior art throughout the specification should in no way be considered as an admission that such prior art is widely known or forms part of the common general knowledge in the field.

Conventional kitchen blenders can process multiple litres of liquid and are powerful enough to blend thick liquids and pastes, crush ice and pulverize some solid foods. They are found in homes, bars, juice bars and restaurants.

Personal or single serving blenders are consumer products that utilise a blending glass, cup or a mug from which a blended beverage can be directly and conveniently consumed. Personal blenders are small, in accordance with only, say, one or two servings. In a personal blender, the blending cup, glass or mug thereafter "vessel" has a base at one end and a drinking rim at the other end. The drinking rim is usually threaded to engage with a blade hub. The hub engages with the vessel and contains rotating blades that act on food in the vessel. On the side of the hub opposite the blades, a coupling component is driven by cooperating coupling component located on a motorised base. After blending, the hub and vessel are removed from the base, inverted and detached from one another. The user drinks from the threaded rim.

OBJECT OF THE INVENTION

It is an object of the present invention to overcome or ameliorate at least one of the disadvantages of the prior art, or to provide a useful alternative.

It is an object of the technology in a preferred form to provide a personal blender assembly including a hub and a vessel, which can be removably attached to a motorised base.

It is an object of the technology in a preferred form to provide a personal blender assembly including a hub and base, wherein the hub is removably attached to a motorised base.

SUMMARY OF THE INVENTION

According to an aspect of the technology in a preferred form, there is provided a blender assembly including:
a blender hub having a plurality of first guide elements;
a blender vessel having a rim, the blender vessel further having a plurality of second guide elements that each cooperate with a respective one of the first guide elements for forming a coupled and a sealed engagement to the blender hub; wherein, releasing the coupling, the first and second guide elements cooperate to provide a two-stage release; a first stage of the release breaking the sealed engagement, and maintaining a loose coupled engagement, between the blender hub and the bender vessel; and a second stage of the release, subsequent to the first stage of the release, releasing the coupled engagement between the blender hub and the blender vessel.

Each of the first guide elements may abuttingly engage a respective one of the second guide elements to bring the blender vessel and blender hub into the sealed engagement. The sealed engagement may be achieved through respective rotation between the blender vessel and blender hub. The sealed engagement may be achieved through respective rotation of less than a relative quarter turn.

In an embodiment, each of the first guide elements and the second guide elements may comprise at least two thread portions that are offset to provide a two-stage release. An outer thread portion from each of the first guide elements and the second guide elements may lead a respective inner thread portion. Engagement between the outer thread portions of respective cooperating first guide elements and second guide elements may form the coupled engagement. Engagement between the outer thread portions and the inner thread protons of cooperating first guide elements and second guide elements may form the sealed engagement. Sizing of at least one of the outer thread portions may be greater than spacing between the outer thread portion and the inner thread proton.

In an embodiment, the first guide element of the blender hub may include a hub thread portion having a lead thread segment, a sealing thread segment and an intermediate thread segment; and the second guide elements may include at least one vessel thread portion that, upon respective rotation between the blender vessel and blender hub, can sequentially engages each segment of the hub thread portion. Abutting engagement between the sealing thread segment and the vessel thread portion may define the sealed engagement; and abutting engagement between the lead thread segment and the vessel thread portion defines the coupled engagement.

In an embodiment, the second guide elements may include at a vessel thread portion having a lead thread segment, a sealing thread segment and an intermediate thread segment; and the first guide element of the blender hub may include at least one hub thread portion that, upon respective rotation between the blender vessel and blender hub, can sequentially engages each segment of the vessel thread portion. Abutting engagement between the sealing thread segment and the hub thread portion may define the sealed engagement, and abutting engagement between the lead thread segment and the hub thread portion defines the coupled engagement.

The intermediate thread segment may interconnect the lead thread segment and the sealing thread segment. The intermediate thread segment may have a thread pitch that is greater than that of the lead thread segment. The intermediate thread segment may have a thread pitch that is greater than that of the sealing thread segment.

The blender hub may have a seal adapted to sealingly engage in an interior surface of a blending vessel when in the sealed engagement. The blender hub may form a sealing close for the blender vessel. The rim of the blender vessel may be substantially smooth.

According to an aspect of the technology in a preferred form, there is provided a food blending device including:
a blending (or blender) hub;
a blending (or blender) vessel that is removably engagable to the blending hub; wherein the blending hub and blending vessel can be sealingly coupled to form a sealed (or closed) configuration.

The blending hub may be engaged to a motorised base.

According to an aspect of the technology in a preferred form, there is provided a blending hub having a seal adapted to sealingly engage in an interior surface of a blending vessel when in the sealed configuration.

The blending hub may mechanically engage the blending vessel. Mechanical engagement may be in the form of one or more fixing elements or formations, each fixing element comprising a pair of cooperating coupling elements, wherein cooperating coupling elements may be respectively located on the blending hub and the blending vessel. A fixing element may include one or more protrusion (radially protruding) that is located on an (radially) outward facing surface of the blending hub that engages one or more protrusion (radially protruding) that is located on an inner wall of the blending vessel. Rotation of the blending vessel with respect to the blending hub, preferably requiring less than a relative quarter turn, brings the respective protrusions into abutting engagement and causes the blending vessel to be sealingly coupled to the blending hub in the sealed configuration. The blending hub may include a circumferential seal element (for example on a circumferential chamfered surface) that sealingly engages an inner rim portion of the blending vessel when in the sealed configuration.

The blending vessel rim may have only part helical-circumferential thread(s) for removably engaging the blending hub. The blending hub mechanically engages the blending vessel using protrusions located on the inner wall of the blending vessel.

According to an aspect of the technology in a preferred form, there is provided a food blending device including:
a blending hub;
a blending vessel that is removably engagable to the blending hub; wherein cooperating coupling element on the blending vessel and hub abuttingly engaged to bring the blending vessel and blending hub into the sealed configuration.

In the sealed or closed configuration the blending vessel rim may be pressed against a seal that is supported by the blending hub. The blending vessel rim may be smooth and lack threads or protrusions.

The blending hub may retain a rotating blade assembly having blending blades at one end and a driven coupling component at an opposite end. The blending hub may have a concave shaped surface under the blades. The concave shaped surface may be configured to minimise fluid pressure exerted on the seal. The driven coupling may be driven by a cooperating drive coupling located on a motorised base. The blending hub may have mechanical features for removably affixing the blending hub to the motorised base.

The blending hub may have a driven coupling component that drives rotation of a blending blade; such that, with the blending vessel and the blending hub in the sealed configuration, the blade is located within a space enclosed by the blending vessel, and the coupling can be externally driven.

The blending hub includes one or more retractable safety lockout fingers mechanisms, wherein each finger is biased into a retracted position. Engaging the blending vessel to the blending hub causes each finger to extend such that, with the blending hub brought to the motorised base, each finger can engage a respective abutment surface on the base for selectively activating a respective one or more safety lockout switch or sensor when the blender hub is sufficiently engaged to the motorised base. It will be appreciated that, without the blending vessel engaged to the blending hub, the fingers will be retracted and unable to cause activation of the receptive safety lockout switch or sensor. Preferably, there are at least two separate safety lockout switch or sensor that each need to be activated by a respective finger from the blender hub before the motor in the base can be activated.

The device may further include a motorised base that supports the blending hub, the motorised base having a rotatable drive coupling that engages a cooperating driven coupling in the blending hub that enables rotation of a blending blade.

BRIEF DESCRIPTION OF THE DRAWINGS

A preferred embodiment of the invention will now be described, by way of example only, with reference to the accompanying drawings in which.

PREFERRED EMBODIMENT OF THE INVENTION

As exemplified in the various embodiments, the technology provides a personal blender, an adapter hub, a personal blender accessory for a conventional kitchen blender, a kitchen blender having personal blender functionality, and a vessel for a personal blender.

Figure 1:
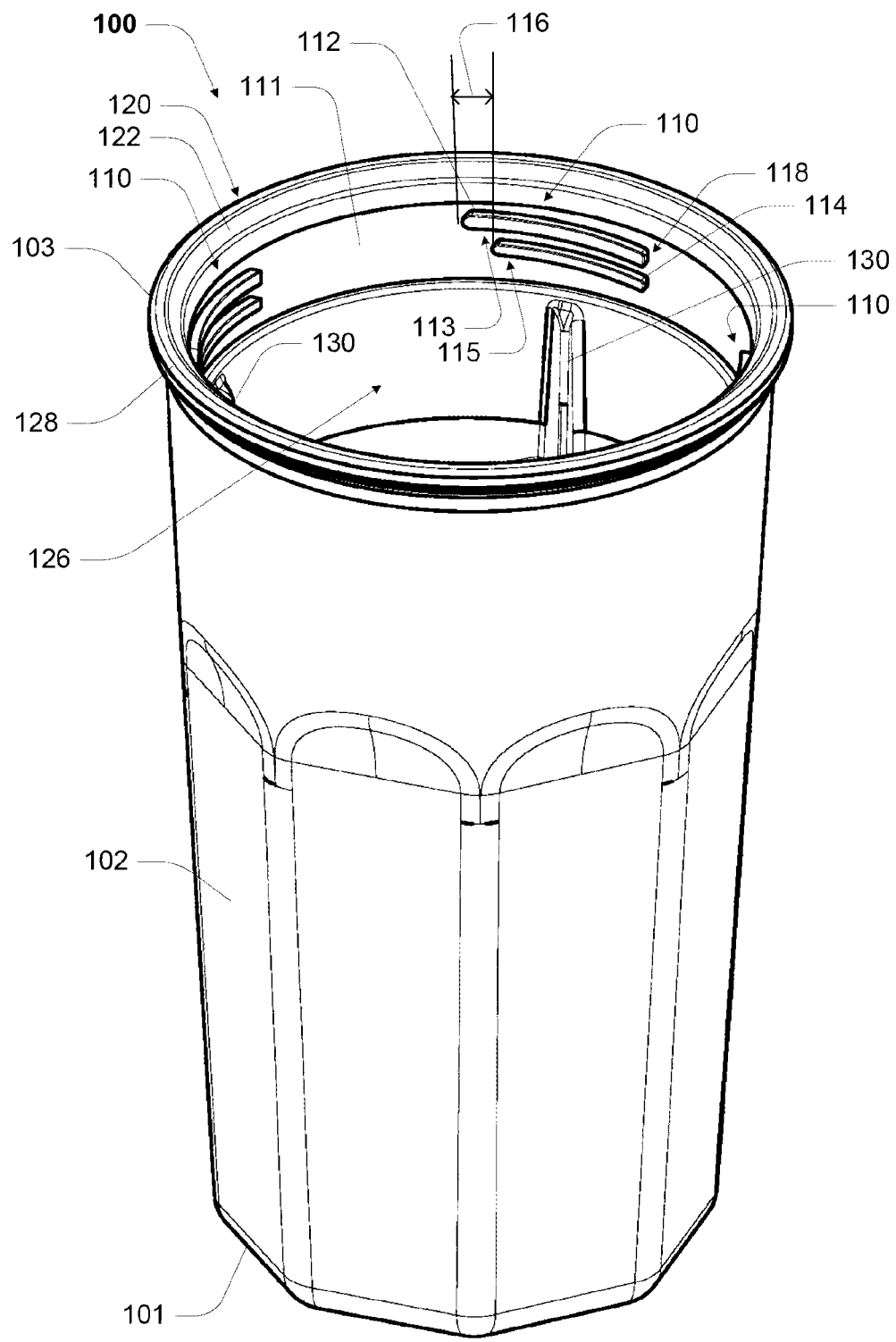
FIG. 1 is a perspective view of an embodiment blending vessel.
Figure 2:
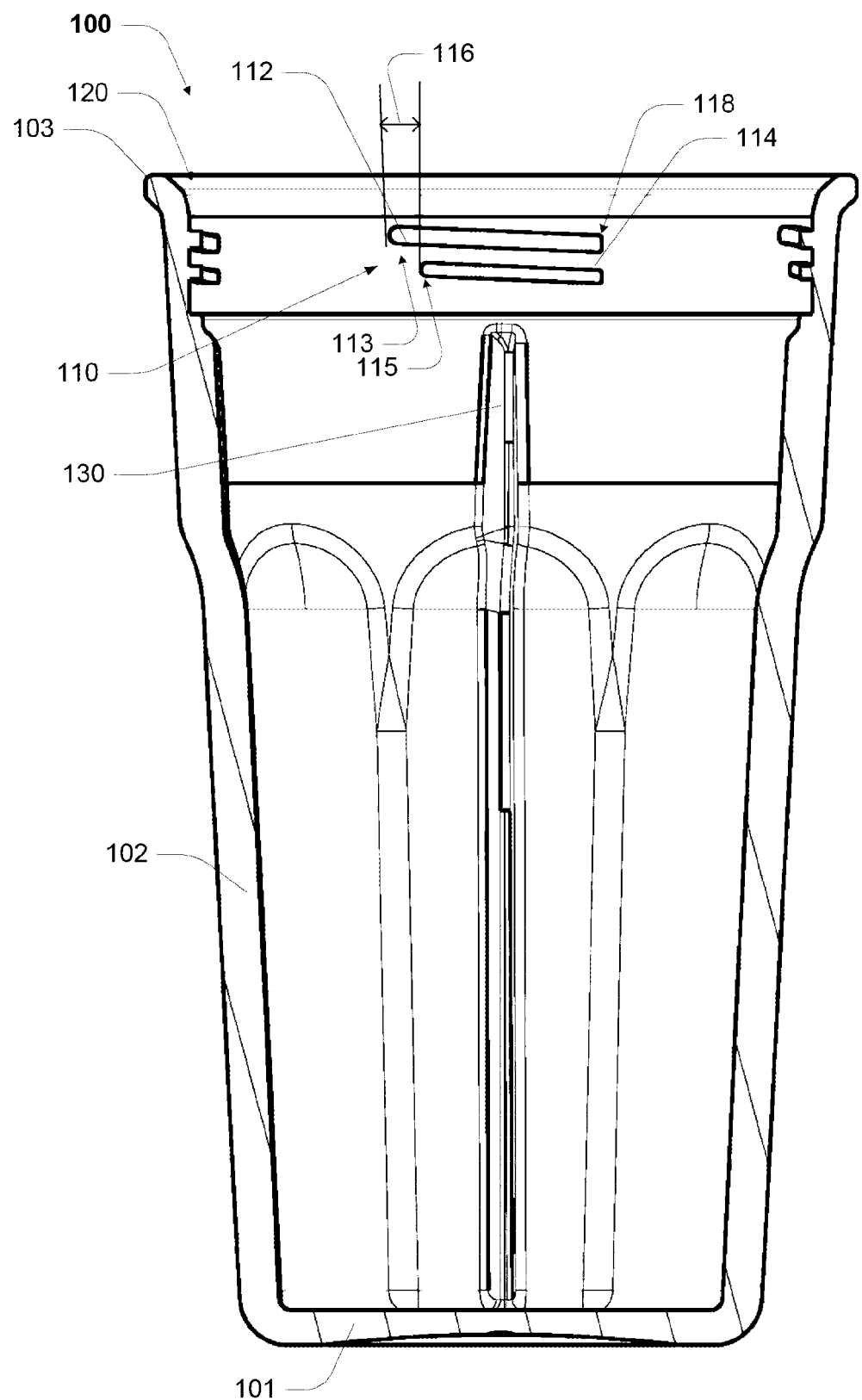
FIG. 2 is a sectional side elevation view of the blending vessel of FIG. 1.

FIG. 1 and FIG. 2 show a perspective view of an embodiment blending vessel 100. The blending vessel 100 is generally in the shape of a personal drinking glass that includes adaptations for use in a personal bender configuration. The blending cup, glass or mug (thereafter "vessel") has a base 101 at one end and an outer wall 102 that terminates in a drinking rim 103 at the other end.

The blending vessel 100 includes coupling elements (or protrusions) 110 that cooperate with corresponding coupling elements (or protrusions) on a blending hub to form a plurality of fixing elements (or formations) that can mechanically engage the blending vessel to the blending hub.

The coupling elements 110 include one or more radially inwardly directed protrusion located on an inner surface 111 of the blending vessel that each forms a helical segment.

Rotation the blending vessel with respect to the blending hub (preferably requiring less than a relative quarter turn) brings the respective coupling elements into abutting engagement, such that the incline of the coupling elements causes the blending vessel to sealingly couple the blending hub in the sealed configuration.

Figure 5:
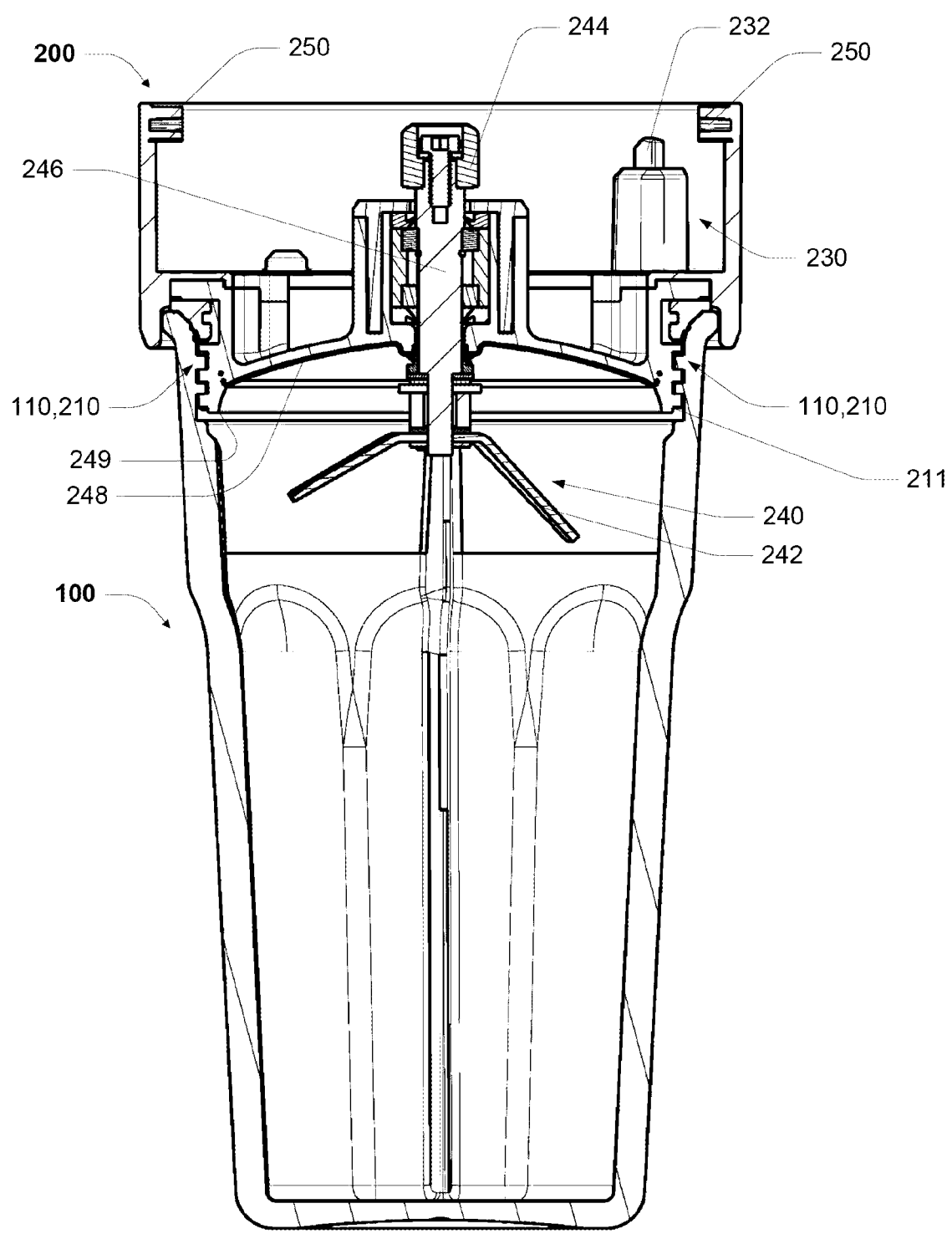
FIG. 5 is a sectional side elevation view of the blending vessel of FIG. 1 engaged to the blending hub of FIG. 3.

It will be appreciated that, in this embodiment blending vessel 100, each coupling element 110 comprises a pair of helically oriented inwardly directed protrusions (112,114) that form abutment surfaces (113,115) for engaging corresponding coupling element of the blending hub. The pair of helical formed protrusions are uniformly spaced or parallel, wherein the element 112 closest the rim leads (at 116) the other element 114 in the direction of engagement for forming a closed configuration (for example, as shown in FIG. 5).

The blending vessel 100 includes an upper lip portion 120 that has an inner circumferential chamfered surface 122 that sealingly engages a circumferential seal of a blender hub when in the closed configuration. The blending vessel further includes a mouth or opening 126 that is surrounded by the lip 120. The lip is smooth, continuous and protruding to extend beyond an outer circumference 128 of the vessel that lies below the rim.

The blending vessel 100 includes one or more internal longitudinal-inwardly-directed ribs 130 for disrupting flow of fluid in the vessel while blending.

Figure 3:
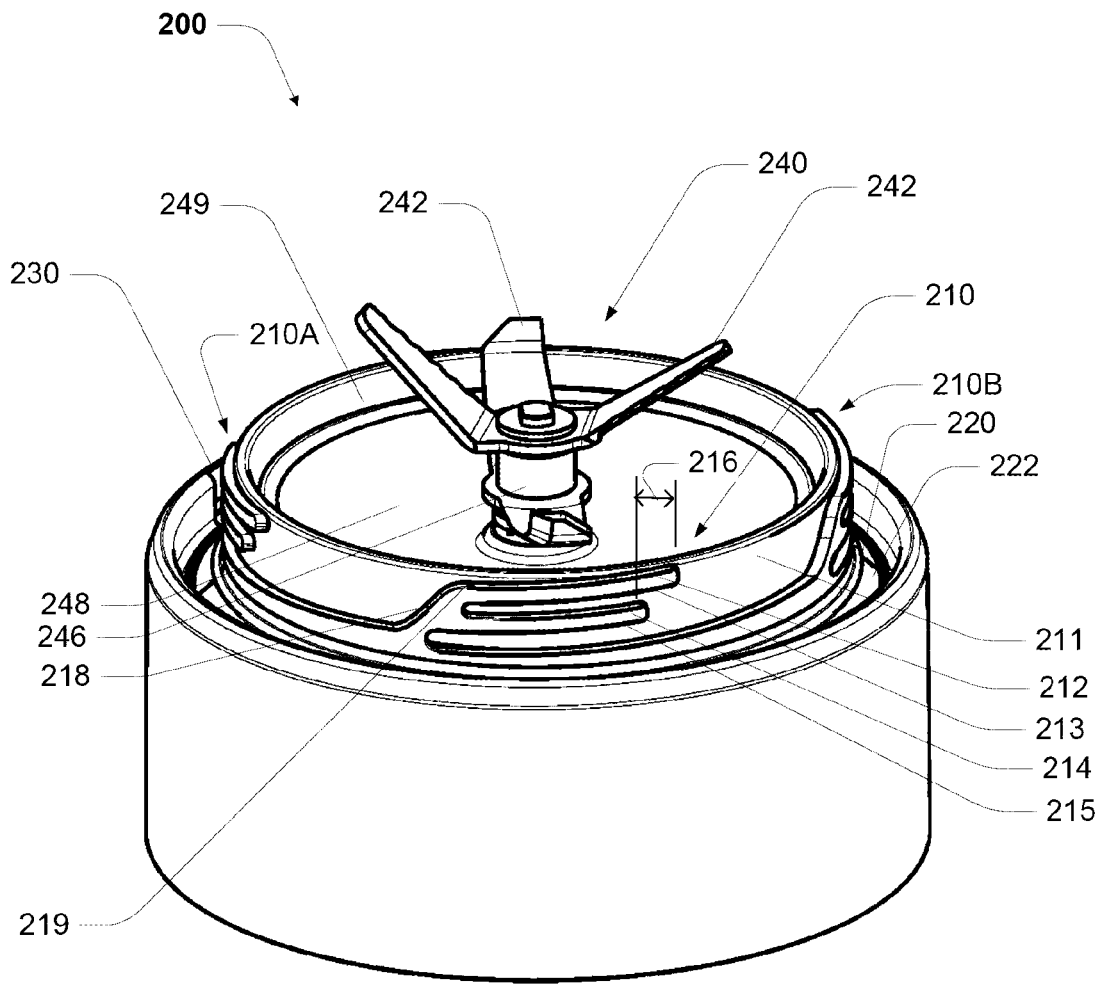
FIG. 3 is a perspective view of an embodiment blending hub.

FIG. 3 shows an embodiment blender hub 200. In this example embodiment, the blender hub 200 has cooperating fixing elements 210 (or formations) that enable the blender hub 200 to be sealingly engaged to the blender vessel 100.

The blending hub 200 includes coupling elements 212, 214 that cooperate with corresponding coupling elements on the blending vessel to form a plurality of fixing elements (or formations) that can mechanically engage the blending vessel to the blending hub. The coupling elements 212, 214 are in the form of one or more (radially outward) protrusions that are located on an outward facing surface 211 of the blending hub, such that each forms a helical segment (or portion).

Rotation of the blending vessel with respect to the blending hub (preferably requiring less than a relative quarter turn) brings the respective coupling elements into abutting engagement to cause the blending vessel to sealingly couple the blending hub in the sealed configuration. It will be appreciated that, sealingly coupling the blending hub to the blending vessel in the sealed configuration can comprise any partial rotation (including a half or third turn so varying turn). In an alternative embodiment, sealingly coupling the blending hub to the blending vessel in the sealed configuration can comprise a full threaded engagements, wherein other disclosed aspect of the invention are used.

It will be appreciated that, in this embodiment blending hub 200, each fixing or coupling elements 210 comprises a pair of helical oriented outwardly directed protrusions (212, 214) that form abutment surfaces (213,215) for engaging corresponding coupling elements (114,112) having respective abutment surfaces (115,113) of the blending vessel. The pair of helical protrusions (212,214) are uniformly spaced or parallel, wherein the protrusion 212 closest the upper element shown leads (at 216) the other element 214 in the direction of engagement when forming the closed configuration.

The blending hub 100 includes an outwardly directed circumferential surface 220 that supports a circumferential chamfered (or angled) seal 222 that sealingly engages a chamfered (or angled) surface 122 of a blender vessel 100 when in a closed configuration (for example, as shown in FIG. 5).

To assist with bringing the respective coupling elements 110 and 210 into mating engagement, the hub further includes a guide ramp 218 located about the outwardly facing surface that supports the coupling elements, wherein the ramp provides a suitably continuous surface that initially guides the trailing end 118 of the blender vessel coupling element 112. It would be appreciated that, upon rotation of the blender vessel, while the respective coupling elements 112 and 212 are initially abutting when the blender vessel and blender hub are not in the sealed or closed configuration, the coupling element 112 slides over the coupling element 212 and down the ramp 218 to engagement with the next coupling formation 210A. Each coupling formation is equally spaced such that the blender vessel and blender jug may be engaged in one of a plurality of angular configurations (each forming the sealed configuration when fully engaged). In this example, the ramp is integral to trailing end 219 of the coupling element 212, which provides a smooth transition when engaging the blender vessel to the blender hub.

The blending hub 100 can further include one or more retractable safety lockout finger mechanisms 230, wherein each finger mechanism is biased (for example, by a spring) into a retracted position as shown in FIG. 3. Operation of the retractable safety lockout mechanisms will be discussed further below.

Figure 7:
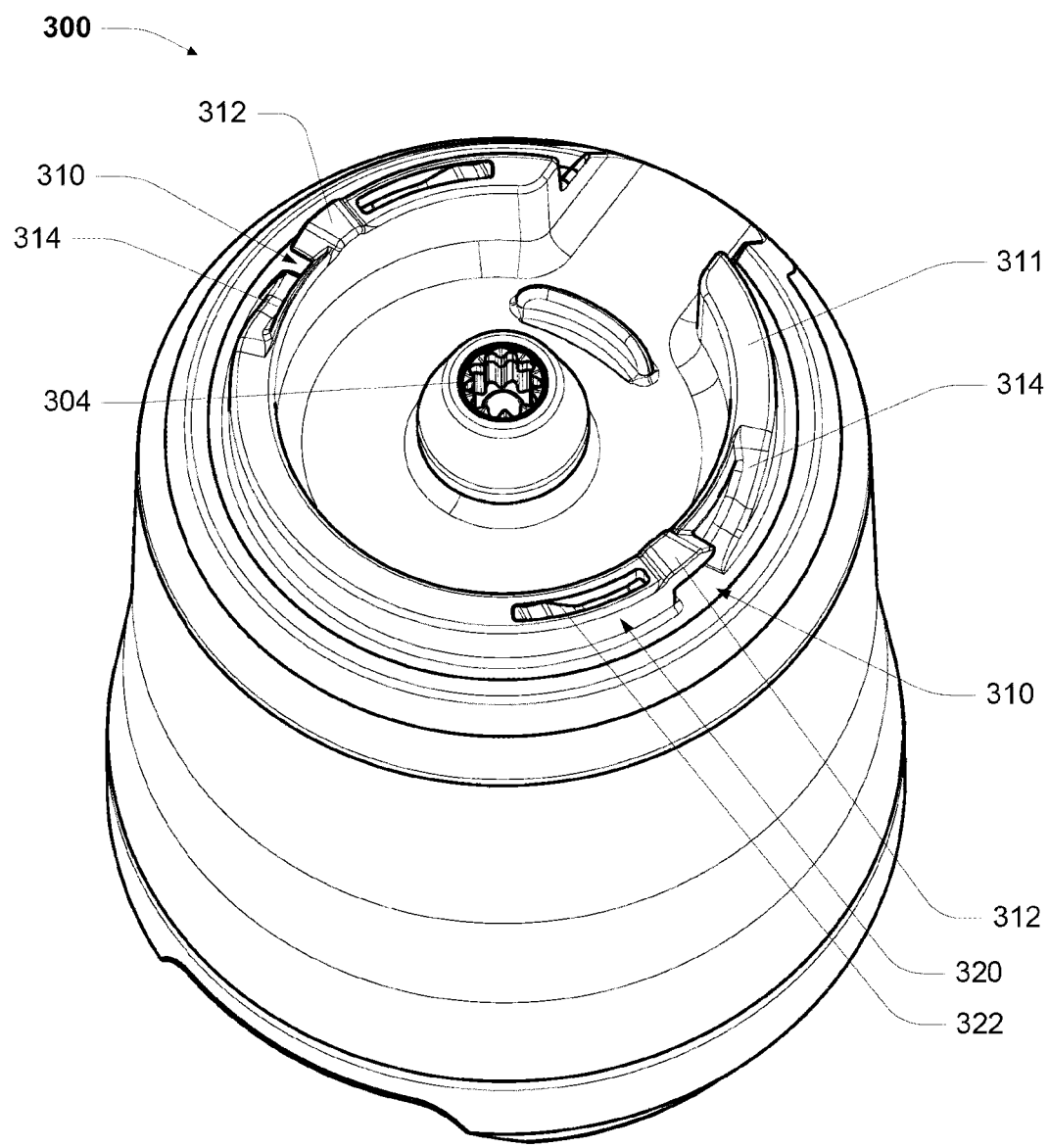
FIG. 7 is a perspective view of an embodiment motorised base.

In this example embodiment, the blender hub 200 further retains a rotating blade assembly 240 having blending blades 242 at one end and a driven coupling element 244 at an opposite end. For example the driven coupling element 244 may be a male coupling element as shown in FIG. 5, of a female coupling element (not shown). The coupling 244 is driven by motorised blending base 300 using a cooperating drive coupling 304 (for example as shown in FIG. 7). The blade shaft 246 protrudes through, for example, a concave or dished surface 248. In some embodiments, curvature of the blades 242 can correspond to the curvature of the dished surface 248.

A circumferential seal 222 (for example a polymeric seal) surrounds a dished surface 248, and is adapted to make a sealing engagement with an interior surface of an upper rim portion of the blending vessel 100. In preferred embodiments, the vessel's sealing surface 122 is tapered or angled to compress or cooperate with the shape and configuration of the seal 222, but may be cylindrical/planar in other embodiments.

It should be appreciated that the invention is not limited to any particular blade size, shape or configuration. Nor is the precise shape of the vessel or its interior an essential feature. Similarly, it will be understood that certain blade configurations, hub configurations, base configurations and vessel configurations will work better than others.

Figure 4:
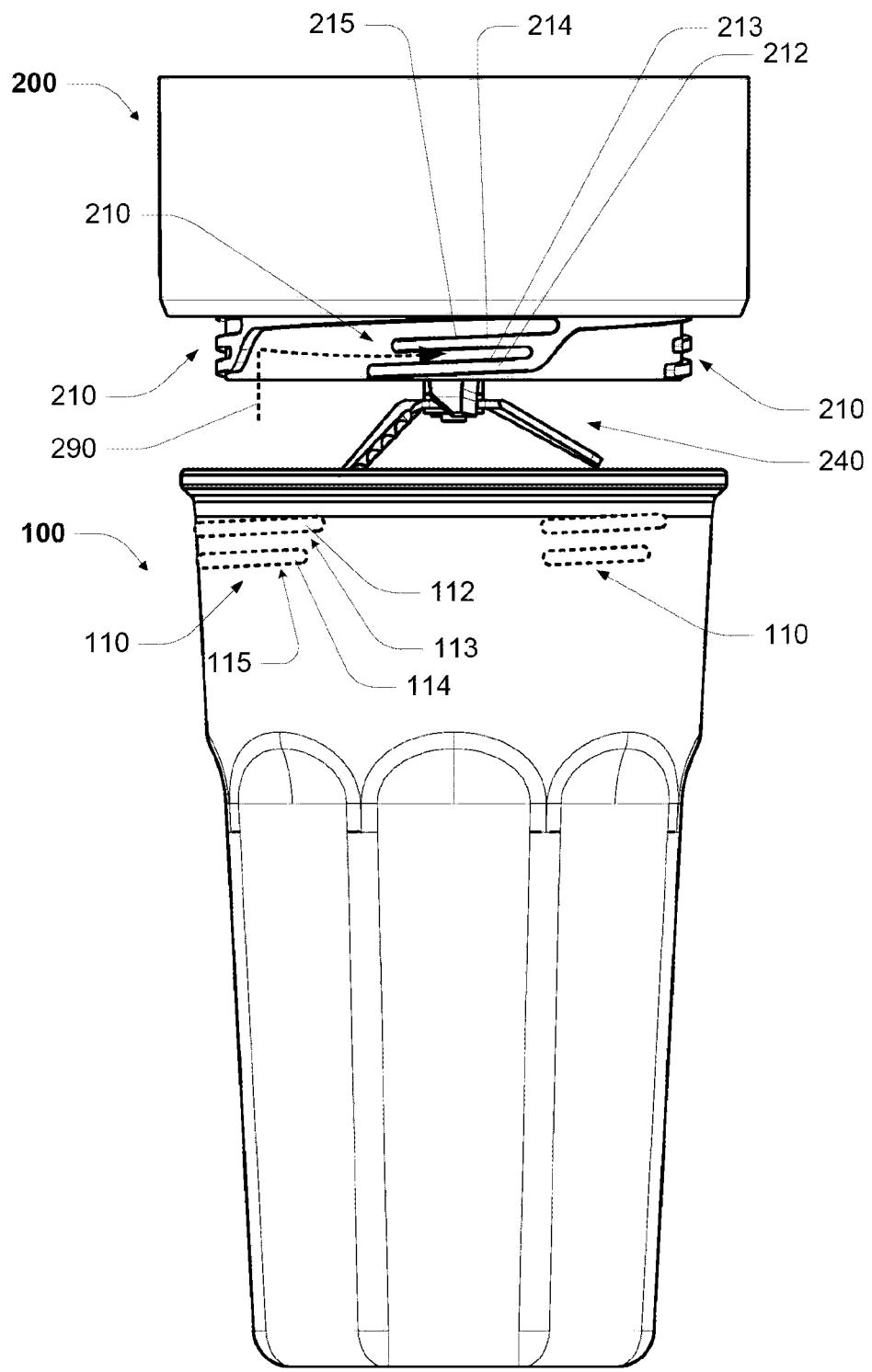
FIG. 4 is an in-line side elevation view of the blending vessel of FIG. 1 and the blending hub of FIG. 3.

FIG. 4 shows the upright blending vessel 100 and the blending hub 200 in-line for forming a closed configuration.

With reference to FIG. 4, the blender vessel is typically filled in an upright position and then brought to engagement with the blender hub, for example along the path 290. In this engagement, the vessel coupling element 112 rides over the hub coupling element 212, into sliding engagement by respective abutment surfaces (113,215) that draw the blender hub and blender vessel together into sealing closed engagement. In this example embodiment, a second threaded/abutment engagement is also made between the vessel coupling element 114 and blender hub coupling element 212.

It would be appreciated that the leading configuration of the vessel coupling element 112 and the blender hub coupling element 212 in relation to the respective direction of coupling, during engagement between the blender vessel and blender hub, there is an intermediate configuration where the blender vessel coupling element 112 overlaps the hub coupling element 212 to restrict immediate vertical separation. This intermediate configuration is transitioned through when engaging and disengaging the blender vessel from the blender hub. It would be appreciated that this intermediate configuration allows only partial vertical separation between the blender vessel and the blender hub, which would enable pressure in the vessel to be dissipated while still retaining the hub local to the rim of the blender vessel. Further relative rotation between the hub and vessel is required to transition from the intermediate configuration. It would also be appreciated that this intermediate configuration can be achieved with a single threaded or abutment engagement between respective coupling elements, for example as shown in FIG. 9 and FIG. 10A through FIG. 10C.

Figure 6:
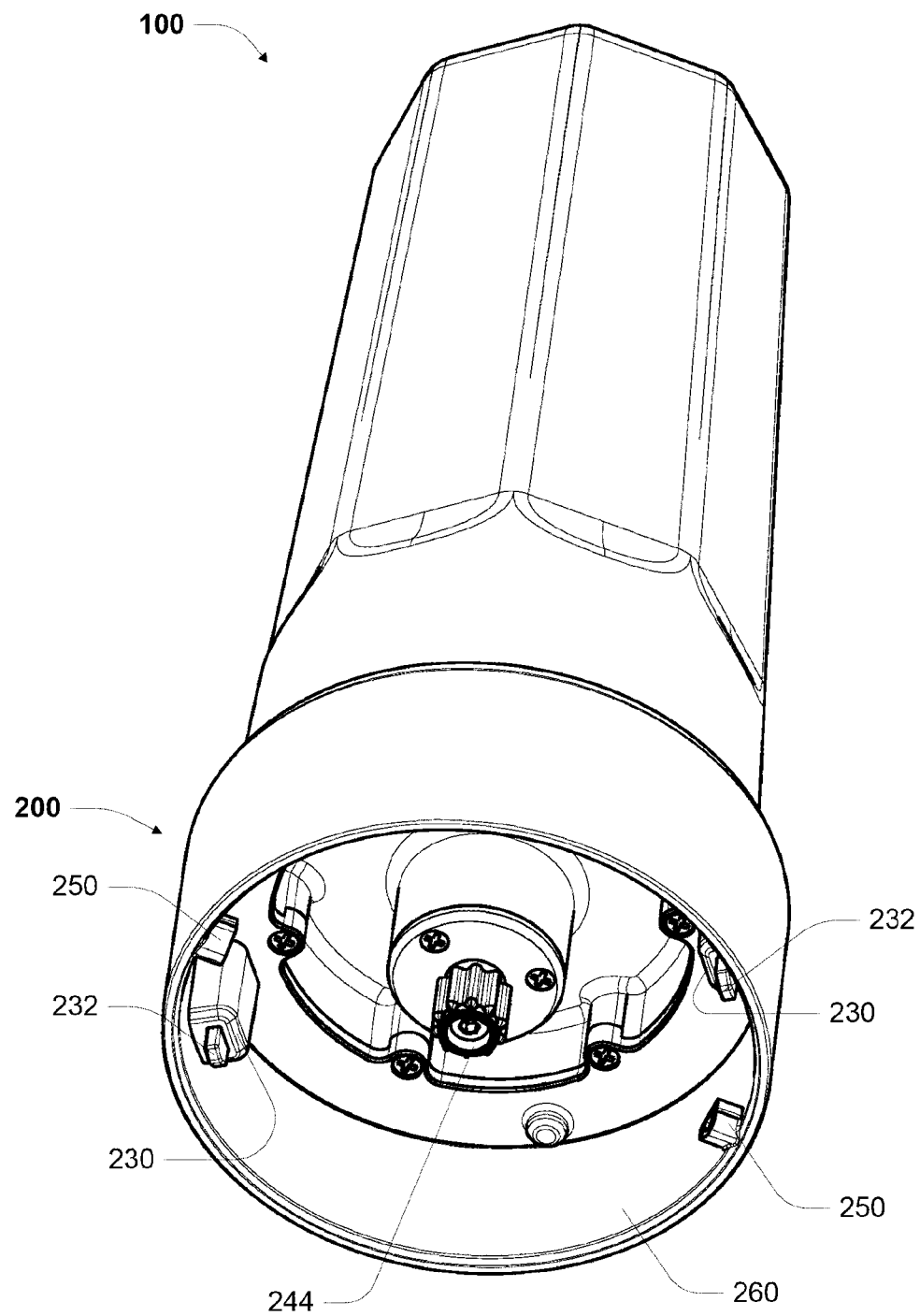
FIG. 6 is a perspective view of the blending vessel of FIG. 1 engaged to the hub of FIG. 3, showing an underside of the blending hub.

In an embodiment, referring to FIG. 1 through FIG. 4, a blender assembly can include:

a blender hub 200 having a plurality of first guide elements 210;

a blender vessel 100 having a rim 120, the blender vessel further having a plurality of second guide elements 110 that each cooperate with a respective one of the first guide elements for forming a coupled and a sealed engagement to the blender hub (e.g. as shown in FIG. 6); wherein, releasing the coupling, the first and second guide elements cooperate to provide a two-stage release; a first stage of the release breaking the sealed engagement, and maintaining a loose coupled engagement, between the blender hub and the bender vessel; and a second stage of the release, subsequent to the first stage of the release, releasing the coupled engagement between the blender hub and the blender vessel.

It will be appreciated that each of the first guide elements (e.g. 210) may abuttingly engage a respective one of the second guide elements (e.g. 210) to bring the blender vessel and blender hub into the sealed engagement. The sealed engagement may be achieved through respective rotation between the blender vessel and blender hub. The sealed engagement may be achieved through respective rotation of less than a relative quarter turn.

Figure 12:
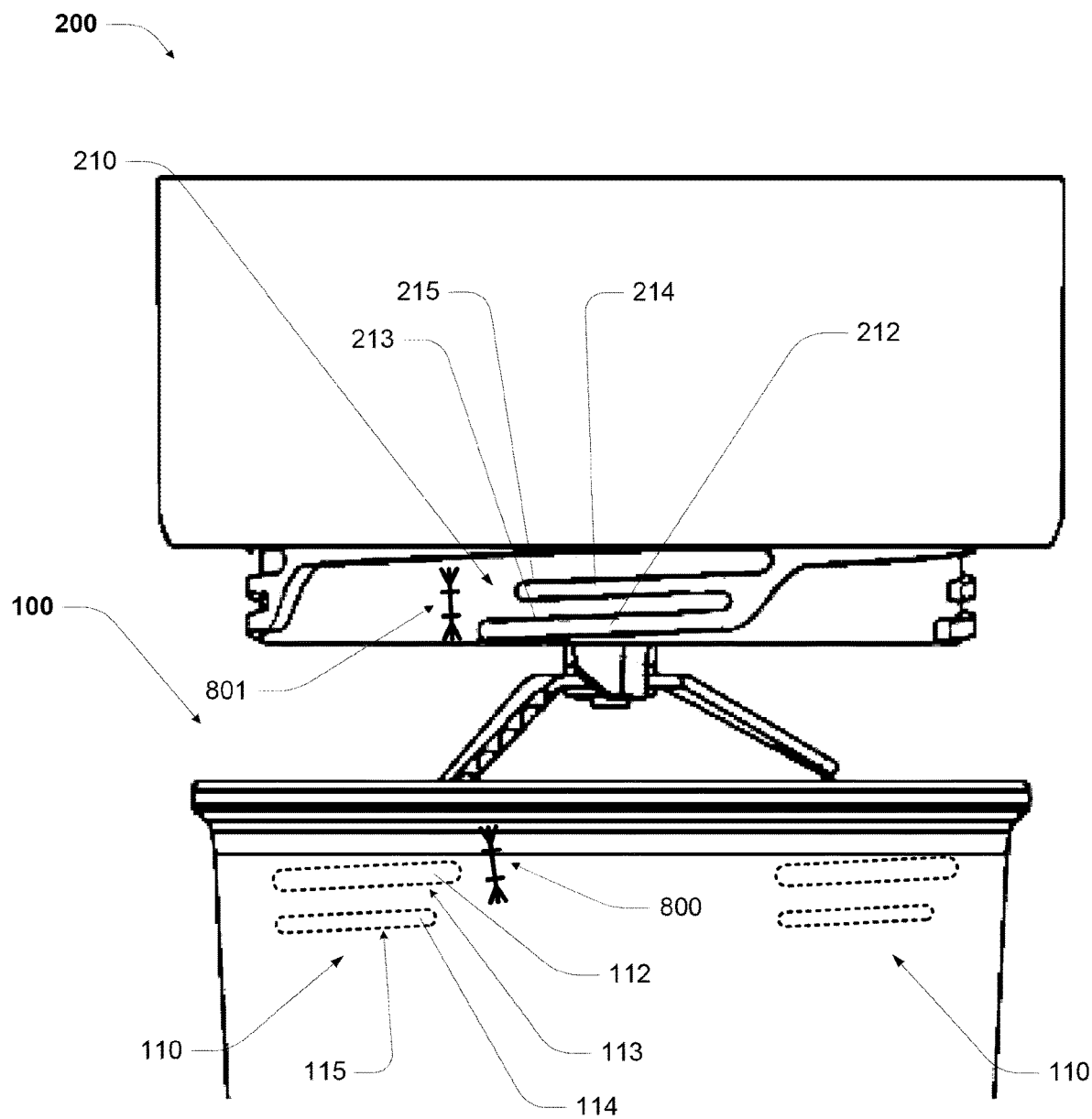
FIG. 12 is a partial enlarged side elevation view of an embodiment blending vessel and an embodiment blending hub.

In this embodiment, each of the first guide elements comprises at least two thread portions (212,214) and the second guide elements may comprises at least two thread portions (114,112). The thread portions can be offset (216, 116) to provide a two-stage release. An outer thread portion from each of the first guide elements and the second guide elements may lead a respective inner thread portion. Engagement between the outer thread portions of respective cooperating first guide elements and second guide elements may form the coupled engagement. Engagement between the outer thread portions and the inner thread protons of cooperating first guide elements and second guide elements may form the sealed engagement. Sizing (e.g. 800) of at least one of the outer thread portions (e.g. 112) may be greater than spacing (e.g. 801) between the outer thread portion and the inner thread proton (e.g. as shown in FIG. 12). FIG. 5 shows a sectional view of an upright blender vessel 100 engaged to the blender hub 200, shown in an orientation used for filling and closing the blender vessel, or an inverted position with reference to use on a motorised base.

As the blender vessel 100 is rotated with respect to the blender hub 200, the fixing elements engage to draw down the hub onto the vessel such that the lip 120 (or lip portion 122) of the vessel is pressed into sealing engagement with the seal 222. The cooperating angled surfaces of the vessel lip portion 122 and seal 222 enables sealing engagement as the hub and vessel are drawn together in forming the closed configuration.

The blending hub 100 includes one or more retractable safety lockout finger mechanisms 230, wherein each finger mechanism is biased (for example, by a spring) into a retracted position. Engaging the blending vessel to the blending hub causes the blending vessel to abuttingly engage and extend a portion (at 232) of each finger mechanism. With the blending hub is engaged to the motorised base, each extended finger portion 232 is configured to engage a respective abutment surface on the motorised base for selectively activating a respective one or more safety lockout switch or sensor when blender hub is safely/suitably engaged to the motorised base.

It will be appreciated that, with the blending vessel not engaged to the blending hub, the fingers will be retracted and unable to cause activation of the receptive safety lockout switch or sensor. Preferably, there are at least two separate safety lockout switches or sensors in the base that each need to be activated by a respective finger from the blender hub before the motor in the base can be activated.

The concave or dish shaped floor or surface 248 under the blades can be configured and shaped to minimise fluid pressure exerted on the seal 222. By way of example, dish shaped portion forms a circular edge 249 where it meets the optional flat surface 211 of the rim that surrounds the bowl shape portion. The action of the blades causes fluid to be ejected off of the bowl shape portion in a direction that is approximately parallel to the ramp angle formed by the bowl shape at that point where it meets the flat portion or outer rim. The ejected flow of liquid and solid particles thus has an ejection angle that is about the same as the ramp angle. In preferred embodiments, both the angle formed by the bowl shape portion adjacent to the edge and the ejection angle are at least 40 degrees with respect to a reference horizontal surface. By directing the flow upward and away from the seals, the pressure on the seals within the vessel can be reduced.

In this example embodiment, the blender hub 200 further includes mechanical features 250 that are used in removably affixing the hub to a blending base, which will be further discussed with reference to FIG. 6 and FIG. 7.

FIG. 6 shows a blender vessel 100 engaged to the blender hub 200, shown in an orientation for use on a motorised base.

It will be appreciated that, with the blending vessel 100 coupled to the blending hub 200, a pair of retractable safety lockout finger mechanisms 230 in the extended configuration such that each have an extended or protruding portion (at 232).

Mechanical features 250 are used in engaging the blending hub to a motorised base. The mechanical features 250 cooperate with a retaining formation on the base for removably retaining the blending hub in an operating configuration on the motorised base.

FIG. 7 is a perspective view of an embodiment motorised base 300.

The base includes retaining formations 310 for releasably retaining the blending hub in an operating configuration on the motorised base. It would be appreciated that, in alternative embodiments, the base may include mechanical features that cooperate with a retaining formation on the hub.

In this embodiment, by way of example only, the retaining formations 310 are formed in a raised annular portion 311. The raised annular portion is preferably received (or is overlapped) by the hub, to assist in locating and/or centralising the hub with respect to the base during operation. For example, the hub may include a skirt 260, which can receive the raised annular portion 311.

Mechanical features 250 are used in engaging the blending hub to a motorised base. The mechanical features 250 cooperate with a retaining formation 310 on the base for removably retaining the blending hub in an operating configuration on the motorised base.

In this embodiment, retaining formations 310 includes a retaining recess 312 for forming a bayonet like engagement with the mechanical feature 250 of the hub. The mechanical feature 250 can be in the form of protrusion that is inwardly directed from the skirt that is receivable by the retaining recess 312. To assist with coupling the hub and base, a guide or ramp 314 is further defined in the raised annular portion 311. The guide or ramp 314 preferably forms a smooth or helical ramp to assist transition into and out of coupling engagement.

During the process of engaging or coupling the hub 200 to the base 300, the hub is located over the base such that the skirt 260 aligns with the raised annular portion 311 of the hub. The mechanical coupling features 250 of the hub, at least initially, can typically be supported by the raised annular portion. Rotation of the hub with respect to the base causes the mechanical coupling features 250 to slide along the annular portion until reaching a guide or ramp 314, whereupon further rotation cause the hub to descend onto the base and into the operating configuration. In the operating configuration the coupling features 250 can be temporarily retained by the retaining recess 312.

The base further includes two arcuate receiving slots 320, each for receiving a respective finger portion of the safety mechanism. It will be appreciated that the juxtaposition between an arcuate receiving slot 320 and retaining recess 312 in the base is required to cooperate with the relative locations between the respective safety mechanism 230 and coupling features 250.

With the blending hub engaged to the motorised base—each safety mechanism 230 has an extended finger portion 232 that is configured to be received by the arcuate slot 320 and engage a respective abutment surface 322 on the motorised base, for selectively activating a respective one or more safety lockout switch or sensor when blender hub is safely/suitably engaged to the motorised base.

It is preferred that there are at least two distinct safety mechanisms that engage separate safety lockout switch or sensor. It will be appreciated that this redundancy improves safety.

It will be appreciated that the ramp 314 (for example, rather than a stop) provides a transition that enables the smooth engagement and disengagement of the hub from the base. The force required to decouple the hub from the base is preferably significantly less than the force required to disengage the hub from the vessel—such that the vessel is not accidently removed/unsealed from the hub when the user is intending to disengage the hub from the base.

It would be appreciated that the construction of the thread engagement on the jar really works because the helical guide surface shown as 314 allows for smooth engagement on a helical path (both up and down). During use, this reduces any undue force that works against the threads for allowing the jar & the blade hub portion to be detached, and improves safety.

Figure 8:
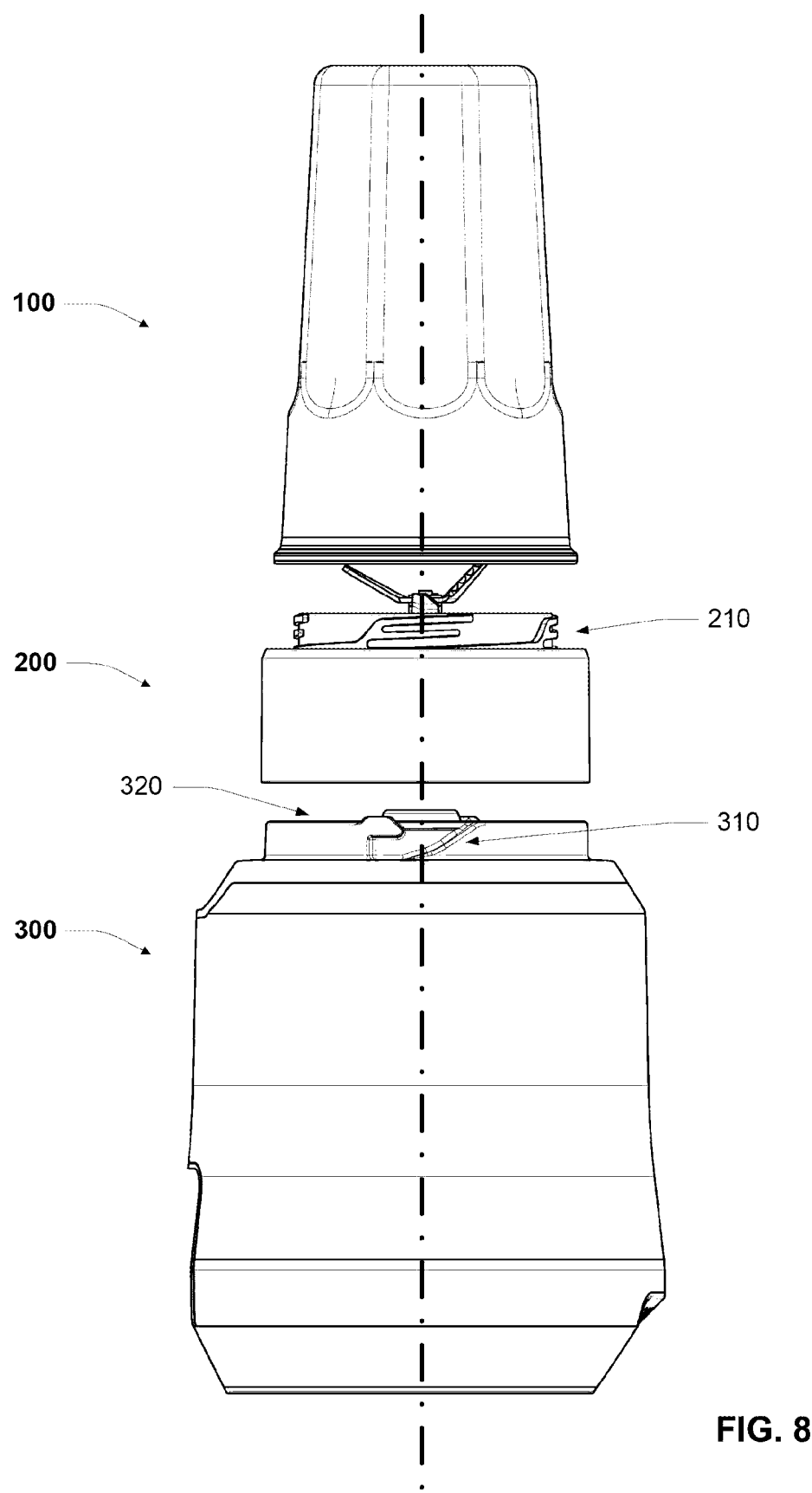
FIG. 8 is a side inline view of the blending vessel of FIG. 1, the blending hub of FIG. 3 and the base of FIG. 6.

FIG. 8 shows a side in-line view of the blending vessel 100, the blending hub 200 and the motorised base 300. It will be appreciated that the blending vessel 100 is filled during operation with blending ingredients and engaged to the blending hub 200 while in an upright configuration.

Figure 9A:
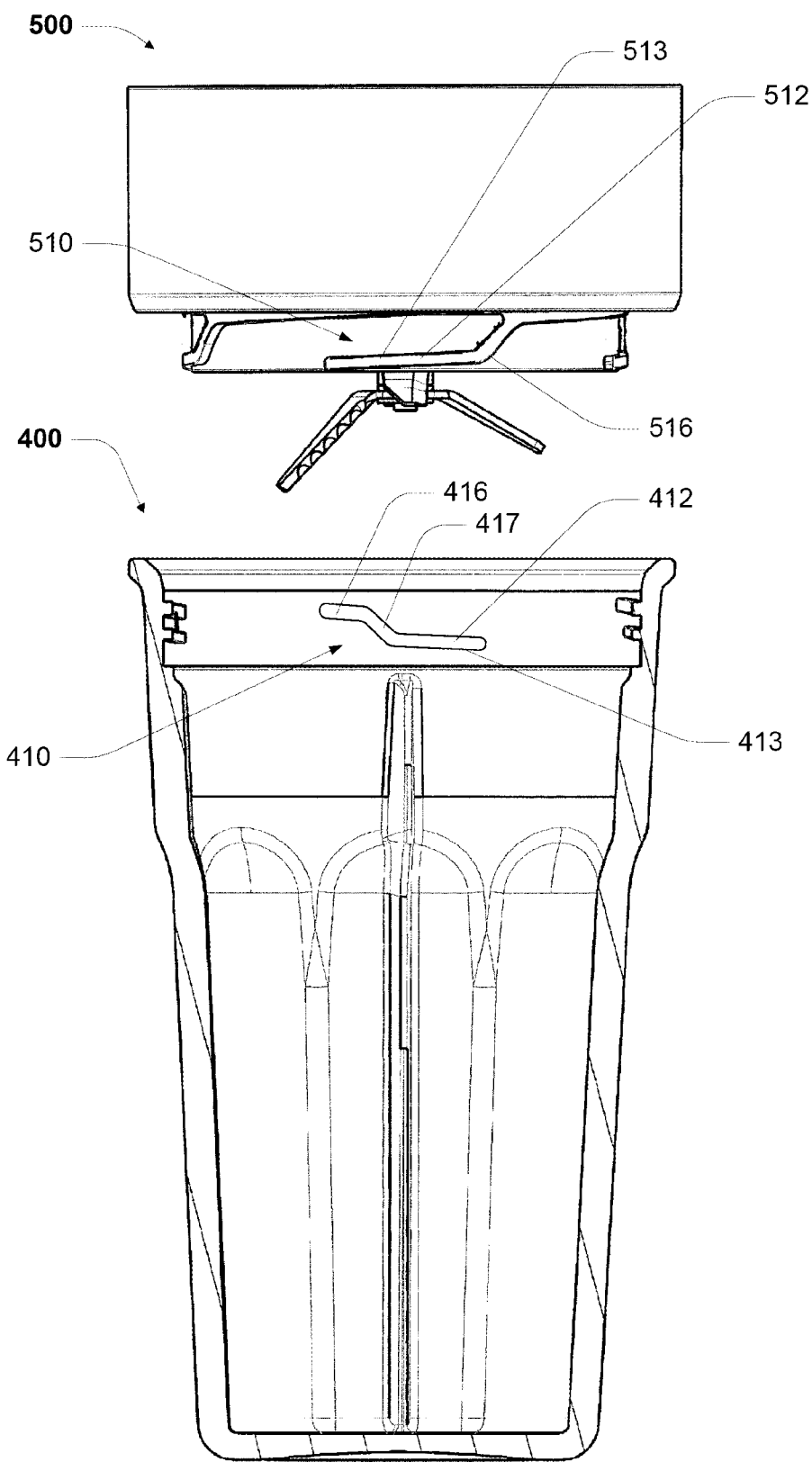
FIG. 9A through FIG. 9D are side elevation views of an embodiment blending vessel and an embodiment blending hub.

FIG. 9A is side elevation view of an embodiment blending vessel 400 and an embodiment blending hub 500 having alternative fixing elements that can mechanically engage the blending vessel to the blending hub. The fixing elements comprise cooperating coupling elements 410, 510.

It will be appreciated that, in this example embodiment, the blending vessel 400 and hub 500 comprises a plurality of fixing elements or formations, each fixing element comprising a pair of cooperating coupling elements 410, 510. However, it is noted that the vessel is represented in a sectional view while the hub is represented as an elevation, whereby the coupling element 410 appears reversed relative to coupling element 510.

In this embodiment, the coupling element 410 comprises helically oriented inwardly directed protrusion 412 that forms abutment surfaces 413 for engaging a corresponding or cooperating coupling element 512 of the blending hub. The element 412 has a leading portion (at 116), in the direction of engagement used to form a closed configuration, that is closer the rim of the vessel. The transition portion 117 between the leading portion and the main coupling portion 512 is substantially straight or helical.

The corresponding coupling element 512 on the blending hub comprises a substantially straight helically oriented outwardly directed protrusion that forms a sloped abutment surface 513. A ramp portion 516 is located at the trailing end of the coupling element 513 to assist with guiding engagement between coupling elements 412, 512.

Figure 9B:
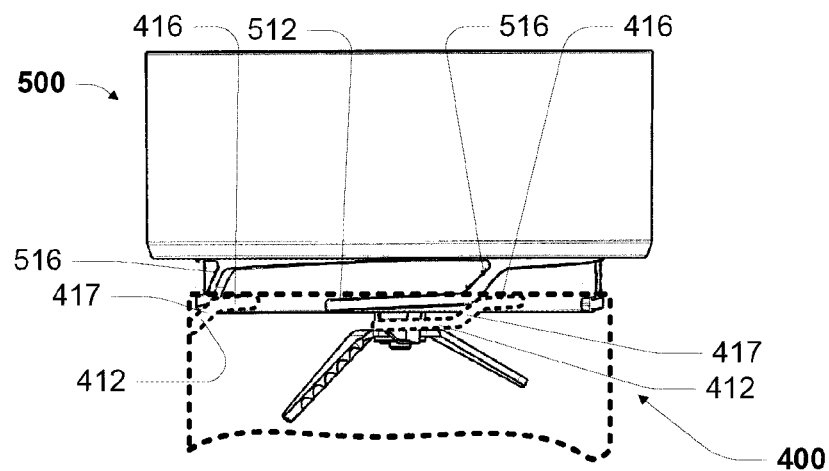
Figure 9C:
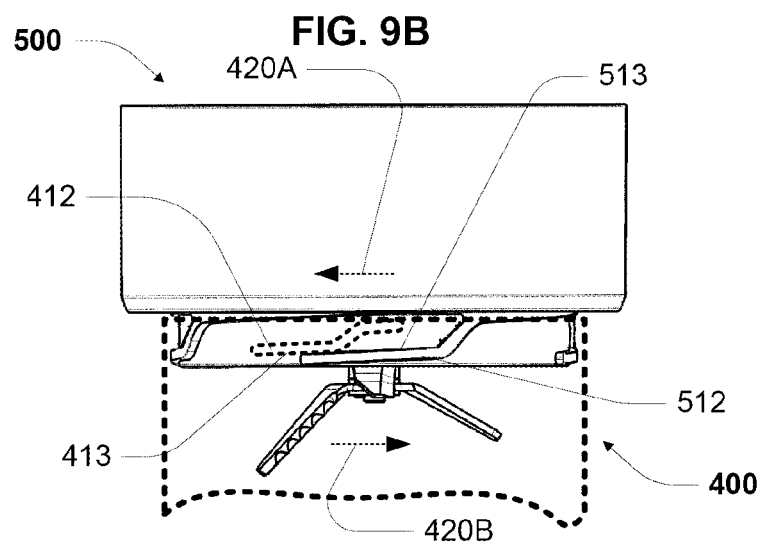

FIG. 9B shows initial engagement of the vessel coupling element and hub coupling element. Upon initial closing of the vessel and hub, the hub 500 is typically located proximal to the vessel 400, such that cooperating coupling elements can be brought into alignment. In this example, a guide ramp 516 abuts a vessel coupling element such that further relative rotation of the hub with respect to the vessel enables the hub and vessel to come together as the hub coupling element slides over the vessel coupling element to form a closed or sealed coupling engagement. It will be appreciated that abutments surfaces (413, 513) of the respective coupling elements (412, 512) are angled (sloped, slanted or ramped) such that mutual sliding abutment (for example references 420A/420B as shown in FIG. 9C) draws the hub and vessel into a sealed coupled engagement. As previously described, the hub can have a circumferential seal that sealingly engages a rim portion of the vessel.

Figure 9D:
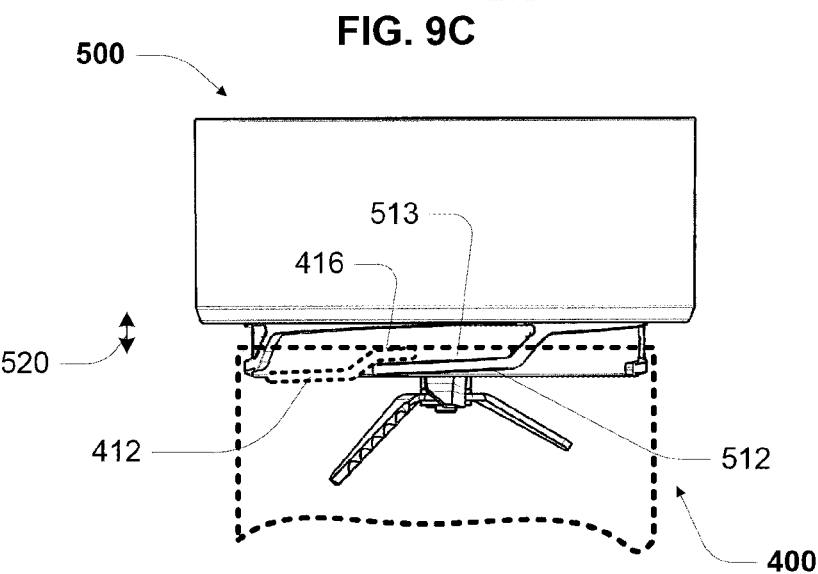

FIG. 9D shows an intermediate release configuration. The hub and the vessel are transitioned from the closed sealed configuration (as shown in FIG. 9C), such that the main close abutment surfaces (413, 513) are not abutting, and the raised (now trailing) portion 416 of the coupling element 412 is configured to enable partial release 520 between the hub and the vessel.

Figure 10:
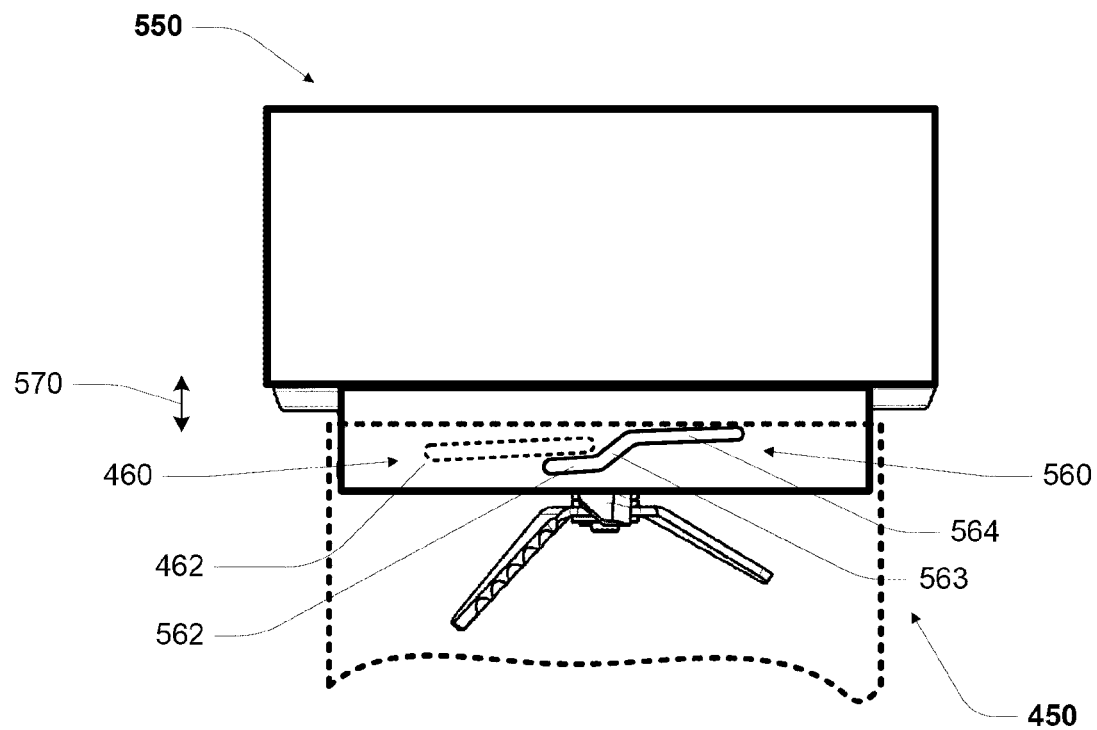
FIG. 10 is a side elevation view of an embodiment blending vessel and an embodiment blending hub.

FIG. 10 shows an alternative embodiment, wherein the vessel 450 coupling element 462 is substantially straight and the hub 550 coupling element 562 may include a leading (or initial) raised (or extended) portion 564 for defining the intermediate release configuration allowing partial separation 570 of the vessel and hub.

Figure 11A:
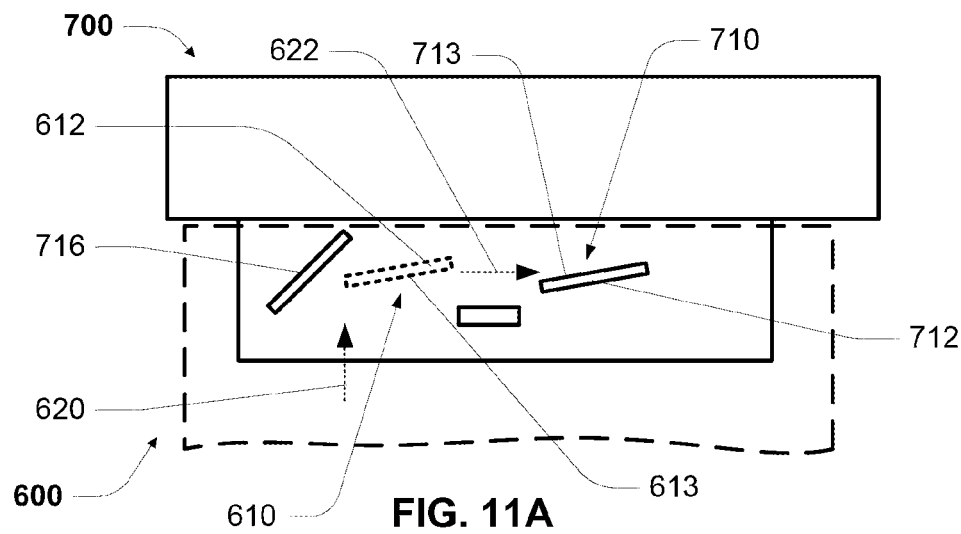
FIGS. 11A through 11C are schematic views showing a sequence for engaging and disengaging an embodiment blending vessel and an embodiment blending hub.
Figure 11B:
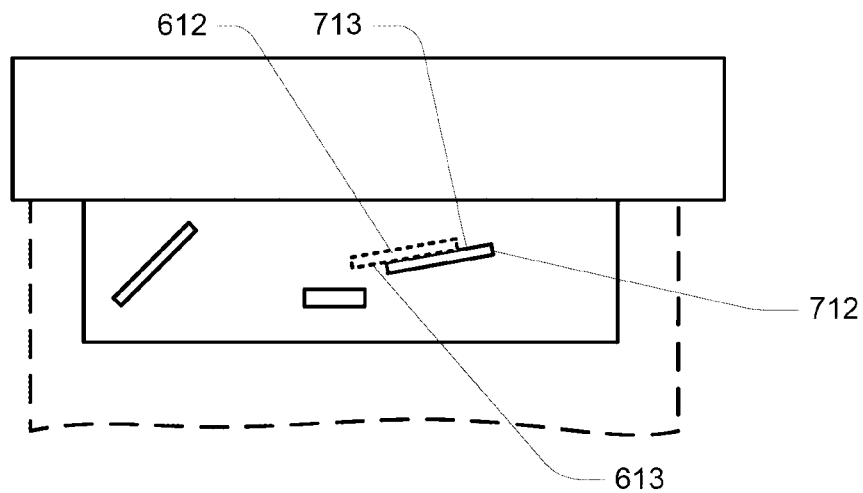
Figure 11C:
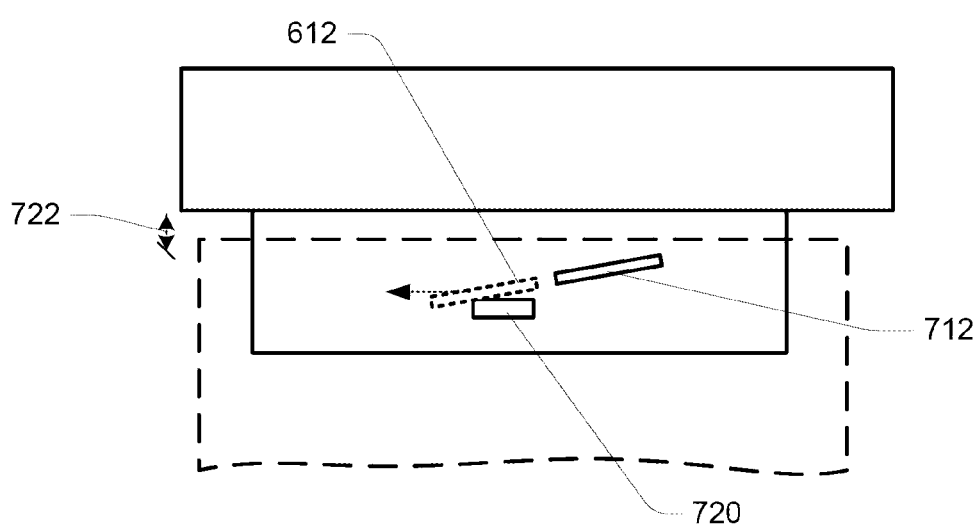

FIGS. 11A through 11C show side elevation views of an embodiment blending vessel 600 and an embodiment blending hub 700 having an alternative fixing elements that can mechanically engage the blending vessel to the blending hub. The fixing elements comprise cooperating coupling elements 610,710.

FIGS. 11A through 11C are schematic views of a fixing element that showing a sequence for engaging and disengaging an embodiment blending vessel and an embodiment blending hub. It will be appreciated that these views teach a generalised aspect of the technology.

FIG. 11A shows initial engagement of a vessel coupling element 610 and hub coupling element 710. Upon initial closing of the vessel and hub, the hub 700 is typically located proximal to the vessel 600, such that cooperating coupling elements can be brought into alignment. In this example, a guide ramp 716 abuts a vessel coupling element 612 (at 620) such that further relative rotation of the hub with respect to the vessel (at 622) enables the hub and vessel to come together as the hub coupling element 712 slides over the vessel coupling element 612 to form a closed or sealed coupling engagement. It will be appreciated that abutments surfaces (613,713) of the respective coupling elements (612, 712) are angled (sloped, slanted or ramped) such that mutual sliding abutment draws the hub and vessel into a sealed coupled engagement as shown in FIG. 11B. As previously described, the hub can have a circumferential seal that sealingly engages a rim portion of the vessel.

FIG. 11C shows an intermediate release configuration. The hub and the vessel are transitioned from the closed sealed configuration (as shown in FIG. 11B), such that the main close abutment surfaces (613,713) are not abutting. The vessel 600 can be partially separated from the hub 700, where the vessel coupling element 612 abuts a stop element 720 of hub, whereby restricting (at 722) initial full release of the hub from the vessel.

In an embodiment, referring to FIG. 9A through FIG. 11C, a blender assembly can include:
a blender hub (500, 700) having a plurality of first guide elements (510, 560);
a blender vessel (400, 600) having a rim, the blender vessel further having a plurality of second guide elements (410, 460) that each cooperate with a respective one of the first guide elements for forming a coupled and a sealed engagement to the blender hub; wherein, releasing the coupling, the first and second guide elements cooperate to provide a two-stage release; a first stage of the release (for example, as shown in FIG. 9D) breaking the sealed engagement, and maintaining a loose coupled engagement, between the blender hub and the bender vessel; and a second stage of the release (for example, as shown in FIG. 9B), subsequent to the first stage of the release, releasing the coupled engagement between the blender hub and the blender vessel.

In an embodiment, referring to FIG. 9A through FIG. 9D, the second guide elements 410 may include at a vessel thread portion having a lead thread segment 416, a sealing thread segment 412 and an intermediate thread segment 417. The first guide element 510 of the blender hub may include at least one hub thread portion 512 that, upon respective rotation between the blender vessel and blender hub, can sequentially engages each segment of the vessel thread portion. Abutting engagement between the sealing thread segment and the hub thread portion may define the sealed engagement, and abutting engagement between the lead thread segment and the hub thread portion defines the coupled engagement.

In an embodiment, referring to FIG. 10, the first guide elements 560 may include at a blender hub thread portion having a lead thread segment 562, a sealing thread segment 564 and an intermediate thread segment 563. The second guide element of the blender vessel 460 may include at least one vessel thread portion 462 that, upon respective rotation between the blender vessel and blender hub, can sequentially engages each segment of the vessel thread portion. Abutting engagement between the sealing thread segment and the hub thread portion may define the sealed engagement, and abutting engagement between the lead thread segment and the hub thread portion defines the coupled engagement.

In an embodiment, referring to FIG. 10, the second guide elements may include at a vessel thread portion having a lead thread segment, a sealing thread segment and an intermediate thread segment; and the first guide element of the blender hub may include at least one hub thread portion that, upon respective rotation between the blender vessel and blender hub, can sequentially engages each segment of the vessel thread portion. Abutting engagement between the sealing thread segment and the hub thread portion may define the sealed engagement, and abutting engagement between the lead thread segment and the hub thread portion defines the coupled engagement.

The intermediate thread segment may interconnect the lead thread segment and the sealing thread segment. The intermediate thread segment may have a thread pitch that is greater than that of the lead thread segment. The intermediate thread segment may have a thread pitch that is greater than that of the sealing thread segment.

Referring to FIG. 12, it will be appreciated that, as previously discussed with reference to FIG. 4, each fixing or coupling elements 210 of the hub comprises a pair of helical oriented outwardly directed protrusions (212,214) that form abutment surfaces (213,215) for engaging corresponding coupling elements (114,112) having respective abutment surfaces (115,113) of the blending vessel. The respective sizing and spacing of the coupling elements are adapted to avoid miss-alignment of the coupling elements when engaged. For example, the width 800 of the coupling element 112 of the vessel is greater than the spacing 801 between protrusions (212,214) of the hub, thereby prohibiting engagement there between.

It will be appreciated that the coupling formation between a hub and a vessel cooperate to draw the hub and the vessel together into a sealed closed configuration. The associated coupling element described herein for a vessel can be applied to the hub and vice versa—requiring only a reorientation of the relevant abutment surfaces for appropriate cooperation.

It will be appreciated that the technology has many commercially viable permutations, both isolating and combining vessel, hub and motorised base in various ways. A drinking vessel may be inventively configured to engage a hub made in accordance with the above teachings. The hub technology is not limited to requiring a specific type of base. However, the nature of the hub can allow for convenient interconnection with a base of a conventional kitchen blender. In this mode of operation the upright glass is filled and the hub is attached before the assembly is inverted and placed on the base. The hub may also be used on small or personal blender bases, hand held equipment or inverted blenders, without limitation. The base may have an interface with settings, speeds or other preferences that are optimised for the hub or its vessel.

Although the invention has been described with reference to specific examples, it will be appreciated by those skilled in the art that the invention may be embodied in many other forms.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected", along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical, or that two or more elements are not in direct contact with each other but yet still co-operate or interact with each other.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

As used herein, unless otherwise specified the use of terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader, or with reference to the orientation of the structure during nominal use, as appropriate. Similarly, the terms "inwardly" and "outwardly" generally refer to the orientation of a surface relative to its axis of elongation, or axis of rotation, as appropriate.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

It will be appreciated that an embodiment of the invention can consist essentially of features disclosed herein. Alternatively, an embodiment of the invention can consist of features disclosed herein. The invention illustratively disclosed herein suitably may be practiced in the absence of any element which is not specifically disclosed herein.

The invention claimed is:

1. A blender assembly including:
a blender hub having a plurality of first guide elements;
a blender vessel having a rim, the blender vessel further having a plurality of second guide elements that each cooperate with a respective one of the first guide elements for forming a coupled and a sealed engagement to the blender hub; wherein, releasing the coupling, the first and second guide elements cooperate to provide a two-stage release; a first stage of the release breaking the sealed engagement, and maintaining a loose coupled engagement, between the blender hub and the blender vessel to at least aid in partly dissipating pressure within the blender vessel to outside the blender vessel; and a second stage of the release, subsequent to the first stage of the release, releasing the coupled engagement between the blender hub and the blender vessel;

wherein each of the first guide elements include at least a first thread segment and a second thread segment, the first thread segment including a leading portion such that the first thread segment is offset from the second thread segment in a direction of engagement to thereby provide the two-stage release.

2. The blender assembly according to claim 1, wherein each of the first guide elements abuttingly engage a respective one of the second guide elements to bring the blender vessel and blender hub into the sealed engagement.

3. The blender assembly according to claim 2, wherein the sealed engagement is achieved through respective rotation between the blender vessel and blender hub.

4. The blender assembly according to claim 3, wherein the sealed engagement is achieved through respective rotation of less than a relative quarter turn.

5. The blender assembly according to claim 1, wherein each of the second guide elements comprise at least a first thread segment and a second thread segment, the first thread segment of the second guide elements including a leading portion such that the first thread segment is offset from the second thread segment of the second guide elements in a direction of engagement and positioned to cooperate with the first and second thread segments of the first guide elements.

6. The blender assembly according to claim 5, wherein engagement between the first thread segments of the first guide elements and the second guide elements forms the coupled engagement.

7. The blender assembly according to claim 5, wherein engagement between the first thread segments of the first guide elements and the second thread segments of the second guide elements forms the sealed engagement.

8. A blender assembly including:
a blender hub having a plurality of first guide elements;
a blender vessel having a rim, the blender vessel further having a plurality of second guide elements that each cooperate with a respective one of the first guide elements for forming a coupled and a sealed engagement to the blender hub; wherein, releasing the coupling, the first and second guide elements cooperate to provide a two-stage release; a first stage of the release breaking the sealed engagement, and maintaining a loose coupled engagement, between the blender hub and the blender vessel, and a second stage of the release, subsequent to the first stage of the release, releasing the coupled engagement between the blender hub and the blender vessel;
wherein each of the first guide elements and the second guide elements comprise at least two thread portions that are offset to provide a two-stage release; and
wherein sizing of at least one of an outer thread portion is greater than a spacing between the outer thread portion and an inner thread portion.

9. The blender assembly according to claim 1, wherein the first guide element of the blender hub includes an intermediate thread segment; and wherein the second guide elements comprises at least one vessel thread portion that, upon respective rotation between the blender vessel and blender hub, sequentially engages each segment of the hub thread portion.

10. The blender assembly according to claim 9, wherein abutting engagement between the second thread segment and the vessel thread portion defines the sealed engagement; and abutting engagement between the first thread segment and the vessel thread portion defines the coupled engagement.

11. The blender assembly according to claim 9, wherein the intermediate thread segment interconnects the lead thread segment and the sealing thread segment.

12. The blender assembly according to claim 1, wherein the blender hub has a seal adapted to sealingly engage in an interior surface of a blending vessel when in the sealed engagement.

13. The blender assembly according to claim 1, wherein the blender hub forms a sealing close for the blender vessel.

14. The blender assembly according to claim 1, wherein the rim of the blender vessel is substantially smooth.

15. A blender assembly including:
a blender hub having a plurality of first guide elements;
a blender vessel having a rim, the blender vessel further having a plurality of second guide elements that each cooperate with a respective one of the first guide elements for forming a coupled and a sealed engagement to the blender hub; wherein, releasing the coupling, the first and second guide elements cooperate to provide a two-stage release; a first stage of the release breaking the sealed engagement, and maintaining a loose coupled engagement, between the blender hub and the blender vessel, and a second stage of the release, subsequent to the first stage of the release, releasing the coupled engagement between the blender hub and the blender vessel;
wherein the first guide element of the blender hub includes a hub thread portion having a lead thread segment, a sealing thread segment and an intermediate thread segment; and the second guide elements comprises at least one vessel thread portion that, upon respective rotation between the blender vessel and blender hub, can sequentially engages each segment of the hub thread portion; and
wherein the intermediate thread segment has a thread pitch that is greater than that of the lead thread segment.

16. A blender assembly including:
a blender hub having a plurality of first guide elements;
a blender vessel having a rim, the blender vessel further having a plurality of second guide elements that each cooperate with a respective one of the first guide elements for forming a coupled and a sealed engagement to the blender hub; wherein, releasing the coupling, the first and second guide elements cooperate to provide a two-stage release; a first stage of the release breaking the sealed engagement, and maintaining a loose coupled engagement, between the blender hub and the blender vessel, and a second stage of the release, subsequent to the first stage of the release, releasing the coupled engagement between the blender hub and the blender vessel;
wherein the first guide element of the blender hub includes a hub thread portion having a lead thread segment, a sealing thread segment and an intermediate thread segment; and the second guide elements comprises at least one vessel thread portion that, upon respective rotation between the blender vessel and blender hub, can sequentially engages each segment of the hub thread portion; and
wherein the intermediate thread segment has a thread pitch that is greater than that of the sealing thread segment.

17. A blender assembly including:
a blender hub having a plurality of first guide elements;
a blender vessel having a rim, the blender vessel further having a plurality of second guide elements that each cooperate with a respective one of the first guide elements for forming a coupled and a sealed engagement to the blender hub; wherein, releasing the coupling, the first and second guide elements cooperate to provide a two-stage release; a first stage of the release breaking the sealed engagement, and maintaining a loose coupled engagement, between the blender hub and the blender vessel to at least aid in partly dissipating pressure within the blender vessel to outside the blender vessel; and a second stage of the release, subsequent to the first stage of the release, releasing the coupled engagement between the blender hub and the blender vessel, wherein each of the second guide elements include at least two thread segments that are offset in a direction of engagement to thereby provide the two-stage release.

18. The blender assembly according to claim 17, wherein the second guide elements comprise a vessel thread portion having a lead thread segment, a sealing thread segment and an intermediate thread segment; and the first guide element of the blender hub includes at least one hub thread portion that, upon respective rotation between the blender vessel and blender hub, sequentially engages each segment of the vessel thread portion.

19. The blender assembly according to claim 18, wherein abutting engagement between the sealing thread segment and the hub thread portion defines the sealed engagement, and abutting engagement between the lead thread segment and the hub thread portion defines the coupled engagement.

* * * * *